(12) United States Patent
Kyllonen

(10) Patent No.: US 10,949,631 B1
(45) Date of Patent: Mar. 16, 2021

(54) MULTI-PART RF TRANSPONDER AND MULTI-WAY ENGAGEMENT SIGNALING

(71) Applicant: AUTOMATED ASSEMBLY CORPORATION, Lakeville, MN (US)

(72) Inventor: Kimmo Kyllonen, Shakopee, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 0 days.

(21) Appl. No.: 16/672,894

(22) Filed: Nov. 4, 2019

(51) Int. Cl.
*G06K 7/10* (2006.01)
*H01Q 21/28* (2006.01)

(52) U.S. Cl.
CPC ......... *G06K 7/10346* (2013.01); *H01Q 21/28* (2013.01)

(58) Field of Classification Search
CPC ............. G06K 7/00; G06K 7/08; G06K 7/081
USPC ................................ 235/451, 439, 375, 435
See application file for complete search history.

(56) References Cited

U.S. PATENT DOCUMENTS

| 9,582,746 B2 | 2/2017 | Mullis et al. |
| 9,996,718 B2 | 6/2018 | Vogel et al. |
| 10,117,080 B2 | 10/2018 | Wilkinson |
| 2006/0049942 A1* | 3/2006 | Sakama ........... G06K 19/07758 340/572.1 |

* cited by examiner

Primary Examiner — Edwyn Labaze
(74) Attorney, Agent, or Firm — Crawford Maunu PLLC

(57) ABSTRACT

A disclosed transponder arrangement includes a transponder integrated circuit (IC), an inductive loop, and a dipole antenna. First and second wires are coupled to the transponder IC and have portions configured for different levels of electrical coupling between one another. Engagement of the inductive loop with an induction portion of the dipole antenna induces current flow in the inductive loop in response to the dipole antenna resonating from a radio frequency (RF) signal, and disengagement makes the transponder IC non-responsive to the RF signal. Depending on a level of electrical coupling between the first and second wires, the transponder IC generates an RF signal that encodes either a first value indicating partial engagement or a second value indicating full engagement in response to the current flow in the inductive loop.

24 Claims, 3 Drawing Sheets

MULTI-PART RF TRANSPONDER AND MULTI-WAY ENGAGEMENT SIGNALING

BACKGROUND

Some applications require verification of proper alignment, engagement, or latching between two parts. Such desired positioning of the parts may be necessary to ensure correct operation of an apparatus or prevent unexpected separation of the two parts. Examples abound in areas, including, but not limited to construction, manufacturing, communications, medical treatment, mining, etc.

SUMMARY

A disclosed transponder arrangement includes a transponder integrated circuit (IC), an inductive loop coupled to the transponder IC, and a dipole antenna having an induction portion. The dipole antenna and inductive loop are configured for engagement with one another. The transponder IC further includes a first wire and a second wire having respective ends coupled to pins of the transponder IC and having portions configured for different levels of electrical coupling therebetween. The dipole antenna resonates in response to a radio frequency (RF) signal. Engagement of the inductive loop with the induction portion of the dipole antenna induces current flow in the inductive loop in response to the dipole antenna resonating. Disengagement of the inductive loop from the induction portion of the dipole antenna makes the transponder IC non-responsive to the RF signal. The transponder IC is configured to generate an RF data signal that encodes a first data value indicating partial engagement in response to the current flow in the inductive loop and a first level of electrical coupling between the first wire and the second wire. The transponder IC is configured to generate an RF data signal that encodes a second data value indicating full engagement in response to the current flow in the inductive loop and a second level of electrical coupling between the first wire and the second wire.

An apparatus that is disclosed includes a first support structure and a transponder integrated circuit (IC) disposed on the first support structure. An inductive loop is coupled to the transponder IC and disposed on the first support structure. A first wire and a second wire have respective ends coupled to pins of the transponder IC and have portions configured for different levels of electrical coupling therebetween. The apparatus includes A second support structure, and a dipole antenna is disposed on the second support structure. The dipole antenna has an induction portion, and the first support structure and the second support structure configured for engagement between the dipole antenna and inductive loop. The dipole antenna resonates in response to a radio frequency (RF) signal from an RFID reader. Engagement of the inductive loop with the induction portion of the dipole antenna induces current flow in the inductive loop in response to the dipole antenna resonating. Disengagement of the inductive loop from the induction portion of the dipole antenna makes the transponder IC non-responsive to the RF signal. The transponder IC is configured to generate an RF data signal that encodes a first data value indicating partial engagement in response to the current flow in the inductive loop and a first level of electrical coupling between the first wire and the second wire. The transponder IC is configured to generate an RF data signal that encodes a second data value indicating full engagement in response to the current flow in the inductive loop and a second level of electrical coupling between the first wire and the second wire.

A disclosed method includes generating a radio frequency (RF) signal by an RF identification (RFID) reader for determining whether two or more structures are fully engaged, partially engaged, or disengaged. The two or more structures have disposed thereon a transponder integrated circuit (IC), an inductive loop coupled to the transponder IC, a dipole antenna having an induction portion, the dipole antenna and inductive loop configured for alternative positioning of engagement with and disengagement from one another, and a first wire and a second wire having respective ends coupled to pins of the transponder IC and having portions configured for different levels of electrical coupling between the first wire and the second wire. The method includes generating by the transponder IC, an RF data signal that encodes a first data value indicating partial engagement in response to current flow in the inductive loop and a first level of electrical coupling between the first wire and the second wire. The method includes generating by the transponder IC, an RF data signal that encodes a second data value indicating full engagement in response to the current flow in the inductive loop and a second level of electrical coupling between the first wire and the second wire. The method includes the RFID reader determining that the two or more structures are partially engaged in response to receiving the RF data signal encoding the first data value, determining that the two or more structures are fully engaged in response to receiving the RF data signal encoding the second data value, and determining by the RFID reader that the two or more structures are disengaged in response to absence of an RF data signal form the transponder IC.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
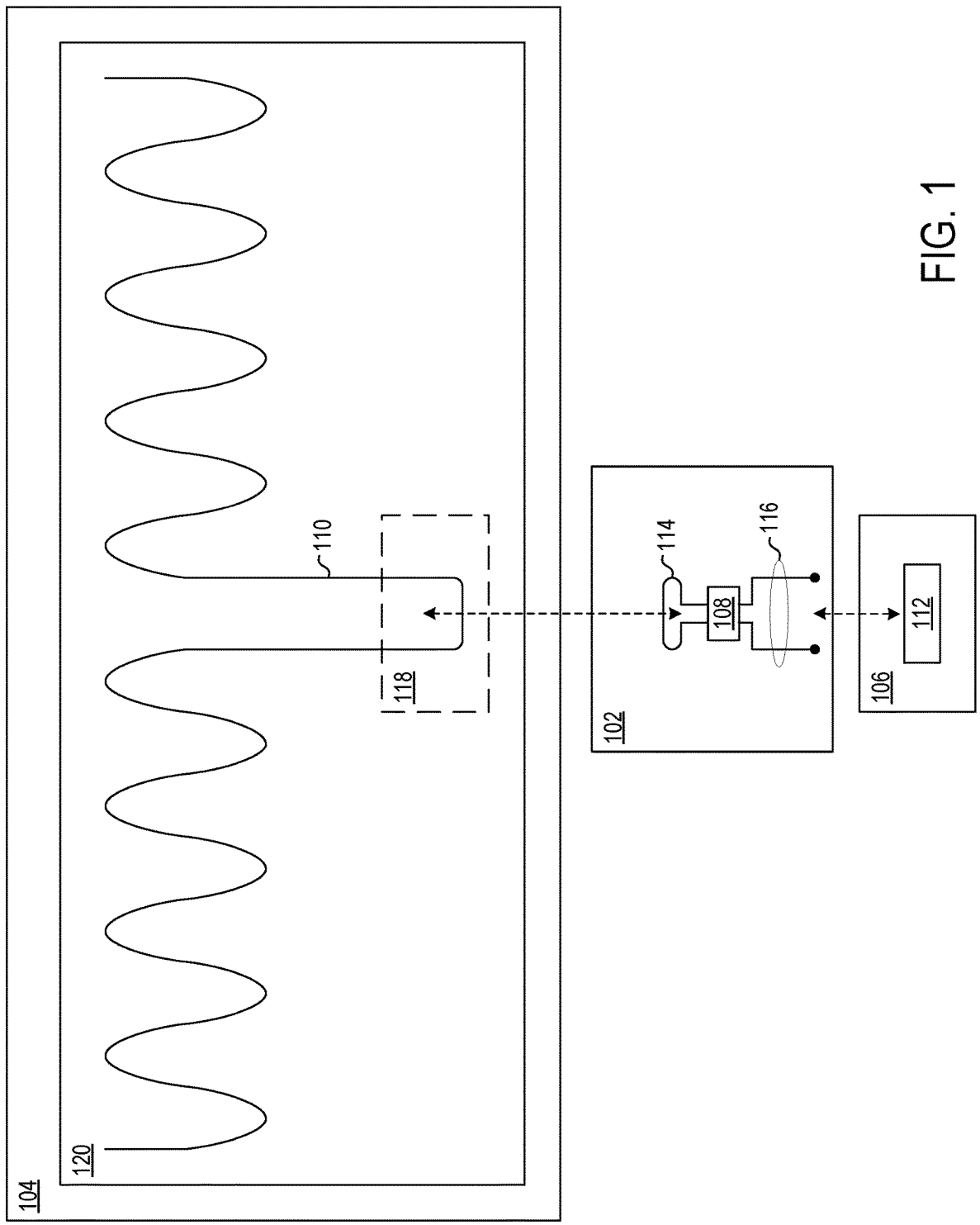
FIG. 1 shows an exemplary application in which a transponder arrangement can be employed to detect and indicate different levels of engagement between three structures.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The disclosed methods and structures can be especially beneficial in applications such as manufacturing, repair, maintenance, monitoring, etc. in which the number of structures needing verification of suitable engagement is too numerous for manual verification or visual inspection is too difficult. In addition, automated assembly lines can benefit from automated verification of proper assembly.

The disclosed structure of an RF transponder arrangement/apparatus can be used to signal different levels of engagement between multiple structures. The parts of the transponder arrangement can be disposed on the structures to be engaged, and when the structures are suitably engaged, the parts of the transponder arrangement align and enable signaling of the state of engagement.

The multi-part transponder arrangement includes a semiconductor transponder integrated circuit (IC) connected to a small inductive loop. One or more pairs of wires can be coupled to the transponder IC, and have portions extending from the transponder IC and electrically disconnected from one another. The transponder arrangement also includes a dipole antenna. The transponder IC, inductive loop, and pair(s) of wires can be disposed on one structure, and the dipole antenna can be disposed on another structure. Engagement/disengagement of the elements of the transponder arrangement can be used by the transponder IC to generate different RF data signals to indicate different levels of engagement of the structures.

In a first level of engagement between the structures, the inductive loop engages with the dipole antenna, but the first level of engagement does not provide an expected level of electrical coupling between the pair of wires. The expected level of electrical coupling can be any level suitable for the application and can be detected based on voltage or current level carried across the wires. In response to an RF identification (RFID) reader, the dipole antenna can induce a current in the inductive loop, and the transponder IC and inductive loop can generate radio waves through the antenna to indicate the first level of engagement.

In a second level of engagement between the structures, the inductive loop engages with the antenna, and engagement of the structures results in an expected level of electrical coupling between the pair of wires to indicate a desired engagement. The expected level of electrical coupling can result from the wires contacting an electrically conductive element or a change in capacitance resulting from the wires contacting a non-conductor. In response to an RFID reader, the dipole antenna can induce a current in the inductive loop, and the transponder IC and inductive loop can generate radio waves through the antenna indicating the second level of engagement.

FIG. 1 shows an exemplary application in which a transponder arrangement can be employed to detect and indicate different levels of engagement between three structures. The three structures that can be engaged are represented by blocks 102, 104, and 106. A transponder IC 108 is disposed on structure 102, a dipole antenna 110 is disposed on structure 104, and connector 112 is disposed on or is an integral part of structure 106. The inductive loop 114 is coupled the transponder IC and can be disposed on the structure 102, either directly or by way of connection to the transponder IC. A pair of wires 116 is coupled to pins of the transponder IC, and when structure 102 is disengaged from structure 106, an insufficient change in electrical coupling between the wires indicates disengagement.

The physical contours of the structures enable the induction portion of the dipole antenna to engage with the inductive loop such that an RF signal from a RFID reader causes the dipole antenna to resonate, and the resonating induces a current in the inductive loop. The current in the inductive loop causes the transponder IC to generate an RF data signal. When the induction portion of the dipole antenna is disengaged from the inductive loop, the distance separating or the non-alignment prevents the induction portion of the dipole antenna from inducing current in the inductive loop.

The engagement between structures can be temporary or permanent depending on the application. Temporary engagement refers to applications in which the structures can be engaged, disengaged, and re-engaged without destroying the structures. Permanent engagement refers to applications in which the structures are joined and cannot be disengaged without destroying the structures. Engagement can be by latching, clamping, locking, adhering, etc., for example.

Structures that can benefit from the ability to detect engagement can include all types, including without limitation, electrical connectors, pneumatic connectors, hydraulic connectors, mechanical connectors, latches, hubs, clamps, hinges, cams, sleeves, collars, hoses, gears, etc. The number of different structures is innumerable and is limited only by the number of different applications requiring particular engagement between two or more structures.

The transponder IC 108 can include logic circuitry (not shown) and/or a microcontroller that implements application logic, memory circuits (not shown) for storage of data to be collected and/or conveyed in response to a signal from an RFID reader, and RF transceiver circuitry (not shown). The transponder IC can be a bare die or a packaged device depending on application requirements. In some applications, the packaged device can include a battery to power the circuitry for logging data gathered by a microcontroller or other circuitry. The logged data can be read by an RFID reader.

The inductive loop 114 can be adjacent to or coiled around the transponder IC 108. Depending on application requirements, the inductive loop can be wire having a round cross section, printed-and-etched, stamped foil, etc.

The dipole antenna 110 includes an induction portion, which is shown as dashed block 118, and two arms/wings that extend from the induction portion. The physical dimensions and shape of the dipole antenna can be selected to tune impedance, frequency and shape the radiation pattern for the desired application.

The multi-part transponder arrangement is made functional by engaging the inductive loop 114 with the induction portion 118 of the dipole antenna 110. The dipole antenna resonates in response to an RF signal from an RFID reader. Resonating of the dipole antenna and engagement of the inductive loop with the induction portion 118 of the dipole antenna, induces current flow in the inductive loop. The transponder IC and inductive loop can generate radio waves through the dipole antenna.

Engagement of the inductive loop 114 with the induction portion 118 has the inductive loop disposed over the induction portion. The particular alignment of the inductive loop and the induction portion for suitable engagement depends on the energy of the RF signal from the RF reader, the size of the inductive loop and induction portion, and the current level required to activate the transponder IC. Disengagement of the inductive loop from the induction portion of the dipole antenna makes the transponder IC non-responsive to the signal from an RFID reader.

The dipole antenna 110 and inductive loop 114 in some arrangements can be configured for temporary engagement. That is, the configuration of the dipole antenna and inductive loop allows alternative positioning of engagement with and disengagement from one another. For example, the structures 102 and 104 can have physical contours that allow the structures to be joined, such as by latching, clamping, locking, adhering, etc., and when properly joined the induction area of the dipole antenna and inductive loop are sufficiently proximate to enable resonating of the dipole antenna to induce a current in the inductive loop. Similarly, the pair of wires can be configured for temporary or permanent engagement with a connector.

The materials and support for the dipole antenna can vary according to application requirements. The dipole antenna 110, in some embodiments, can be disposed on a substrate 120, and the substrate adhered to the structure 104. In other applications, the dipole antenna can be directly adhered to the target structure 104. The substrate can be rigid or flexible, depending on application requirements.

In one approach, the materials selected for the substrate and the wiring of the antennas can provide a clean, economical, and reliable structure. Instead of printing and/or etching an electrically conductive pattern, a fine-gauge wire can be attached to a suitable substrate by an adhesive layer. A wide variety of substrates may be suitable as there is no need for the substrate to withstand the harsh chemicals involved in print-and-etch processes. For some embodiments, the substrate can be a flexible substrate, such as paper or some other dielectric layer.

In one embodiment, the dipole antenna is constructed using a fine gauge bare wire. For example, 44 gauge (AWG) copper wire has been found to be suitable for some implementations. Aluminum may be suitable for other applications. Different gauges may be suitable for different applications. The wire can be glued to the surface of a substrate by a polymer adhesive. In one embodiment, the adhesive is pressure sensitive, which keeps the wire in place as the conductive pattern is formed on the substrate. Relative to a printed and/or etched conductor, the fine-gauge wiring can better maintain its integrity.

The wire can be bare or insulated wire and made of any material suitable for the application. It will be appreciated that "round wire" as used herein does not refer to printed or printed and/or etched patterns of conductive material. Rather, as used herein, round wire refers to one or more strands of conductive material having a circular cross-section and that can be made, for example, by drawing the conductive material through draw plates. In other applications, the dipole antenna can be constructed by print-and-etching, printing conductive ink, or stamping conductive foil, for example.

The transponder arrangement includes one or more pairs of wire leads. One pair of wire leads 116 is shown in the exemplary arrangement. The pair of wires includes a first wire and a second wire, both having ends coupled to respective pins of the transponder IC 108. The portions of the wires extending from the transponder IC are configured to allow for different levels of electrical coupling between the wires.

The connector 112 of the structure 106, when engaged with the wires 116, provides a level of electrical coupling that is different from the level of electrical coupling provided when the connector is not engaged with the wires. The connector can be a component disposed on the structure 106. Alternatively, the structure 106 can be the connector. Depending on the application, the engagement between the structures 102 and 106 can be temporary or permanent, and thereby the engagement between the wires 116 and the connector can be temporary or permanent. Engagement can be by latching, clamping, locking, adhering, etc., for example. In a configuration allowing temporary engagement, the wires are configured for alternative positioning of contact and non-contact with the connector 112. In a position of contact, the wires have a first level of electrical coupling there between (e.g., capacitance), and in a position of non-contact the wires have a second level of electrical coupling. The connector 112 can be an electrically conductive structure of any shape suitable for the application, or any partially conductive or non-conductive structure and material that can cause the desired change in capacitance, for example.

The connector 112 can be an electrical switch. In one embodiment, the switch can be a single pole momentary switch (SPMS) disposed between the lead wires 116, and structure 106 could be an actuator of the switch. In other embodiments, the switch can be a conductive spring, wire, or strip disposed on structure 102 and electrically connected to one of the wires 116, and the structure 106 could be a mechanical structure that can physically actuate the switch.

The transponder IC 108 can generate different RF data signals based on the level of engagement of the structures 102, 104, and 106. The transponder IC 108 is configured to generate an RF data signal that encodes a first data value indicating partial engagement in response to the current flow in the inductive loop 114 and an insufficient level of electrical coupling between the lead wires 116. The transponder IC is configured to generate an RF data signal that encodes a second data value indicating full engagement in response to the current flow in the inductive loop and a sufficient level of electrical coupling between the lead wires. The sufficient and insufficient levels of electrical coupling can be indicated by an electrical connection/disconnection between the wires, such as by an electrically conductive structure, or by different levels of capacitance.

Though three structures 102, 104, and 106 are illustrated, various applications can involve engaging two structures with one another or engaging more than three structures with one another. In a two-structure arrangement, the transponder IC, inductive loop, and dipole antenna could be disposed on one structure, and a second structure could have a connector that changes the electrical coupling between the pair of wires when the first and second structures are properly engaged. In response to an RFID reader and the two structures being properly engaged, as indicated by the expected electrical coupling between the pair of wires by the connector, the transponder IC can generate an RF data signal indicating the proper engagement. In response to an RFID reader and the two structures being disengaged, as indicated by absence of the expected electrical coupling between the pair of wires, the transponder IC can generate an RF data signal indicating the disengagement.

In a multi-structure arrangement having more than three structures to be engaged, the transponder IC can have multiple pairs of wires connected thereto, and two or more of the structures can have respective connectors for creating a desired level(s) of electrical coupling between the pairs of wires, respectively. The RF data signal generated by the transponder IC can indicate which of the two or more structures are properly engaged with the structure having the transponder IC pair(s) in response to determining which of the pairs of wires have the expected level of electrical coupling.

Figure 3:
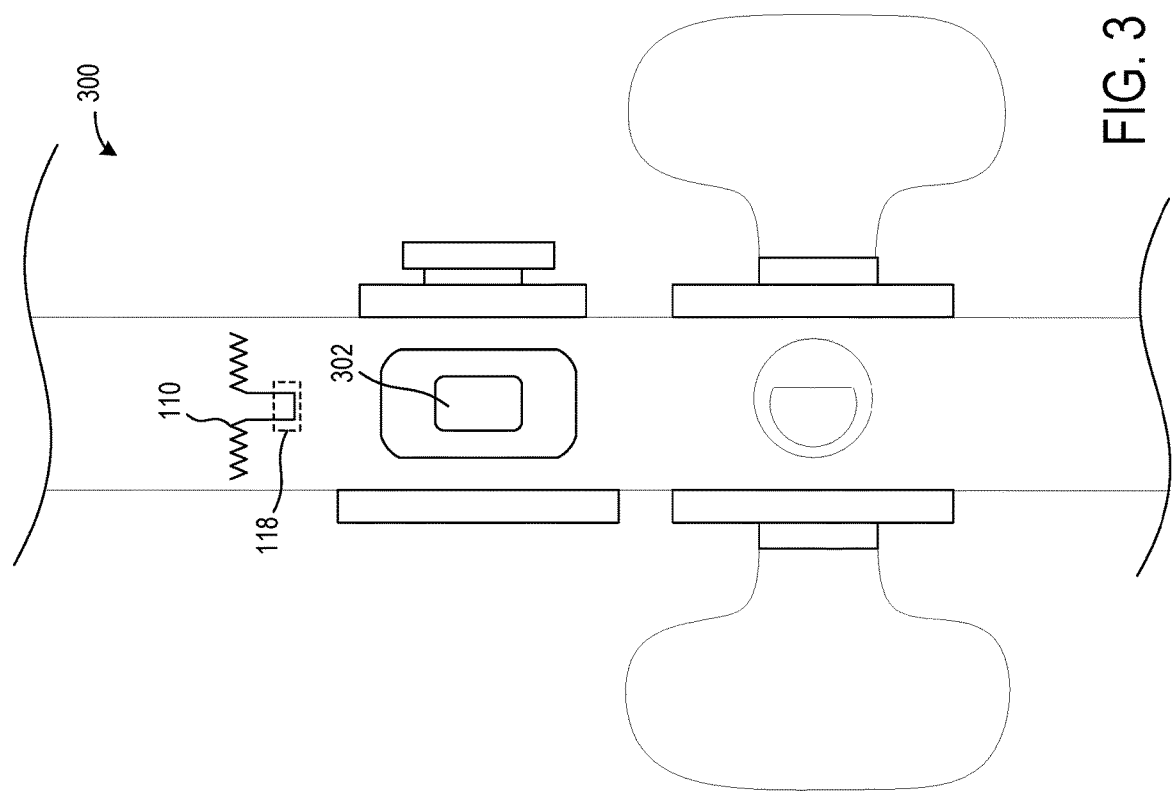
FIG. 3 shows parts of a door and components of a transponder arrangement.
Figure 2:
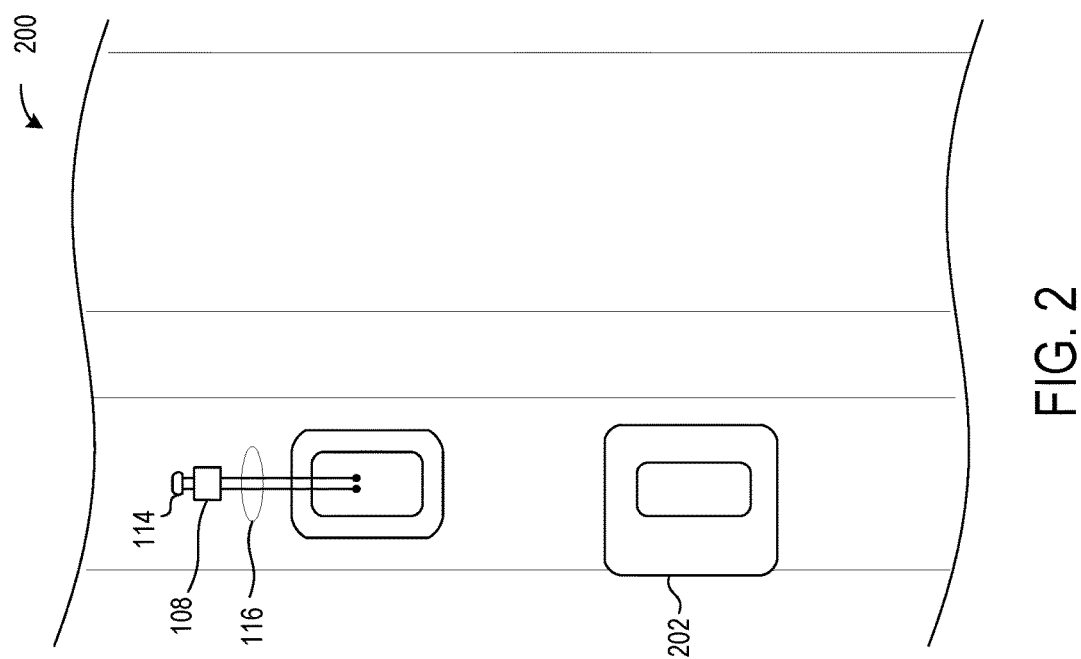
FIG. 2 shows parts of a door jamb and components of a transponder arrangement.

FIGS. 2 and 3 illustrate application of the disclosed multi-part transponder arrangement to latching and locking a door. FIG. 2 shows parts of a door jamb 200, and FIG. 3 shows parts of a door 300. The door can be latched to and not locked to the door jamb, latched and locked to the door jamb, or not latched to the door jamb and thereby not locked to the door jamb. The engagement/disengagement of the parts of the transponder arrangement can be used to detect and signal the latched and locked states of the door. In the exemplary structure, the transponder IC 108, inductive loop 114, and wire leads 116 are attached to the door jamb. The dipole antenna 110 is attached to the door.

For purposes of illustration, the door can be latched to the strike plate 202 on the door jamb. In the latched position, the inductive loop 114 engages the induction portion 118 of the dipole antenna 110. In the locked position, the deadbolt 302 of the door is engaged with the door jamb, and engagement of the deadbolt with the wires 116 can produce a desired level of electrical coupling between the wires. When the door is latched to the jamb, but not locked, the transponder IC can detect and signal a first level of engagement. When the door is both locked and latched to the jamb, the transponder IC can signal a second level of engagement. When the door is not latched, the transponder IC would not be responsive to an RF signal from an RFID reader, and the RFID reader could thereby determine that the door is not latched.

As an alternative to the example of FIGS. 2 and 3, the dipole antenna could be attached to the door jamb, and the transponder IC and connected parts could be attached to the door.

The disclosed transponder arrangement could be employed in multi-way latching mechanisms that are similar to waterproof battery compartment doors, such as those found on cameras. A first latch when engaged holds the door in a closed position, and a second latch when engaged holds the first latch in the engaged position.

Figure 4:
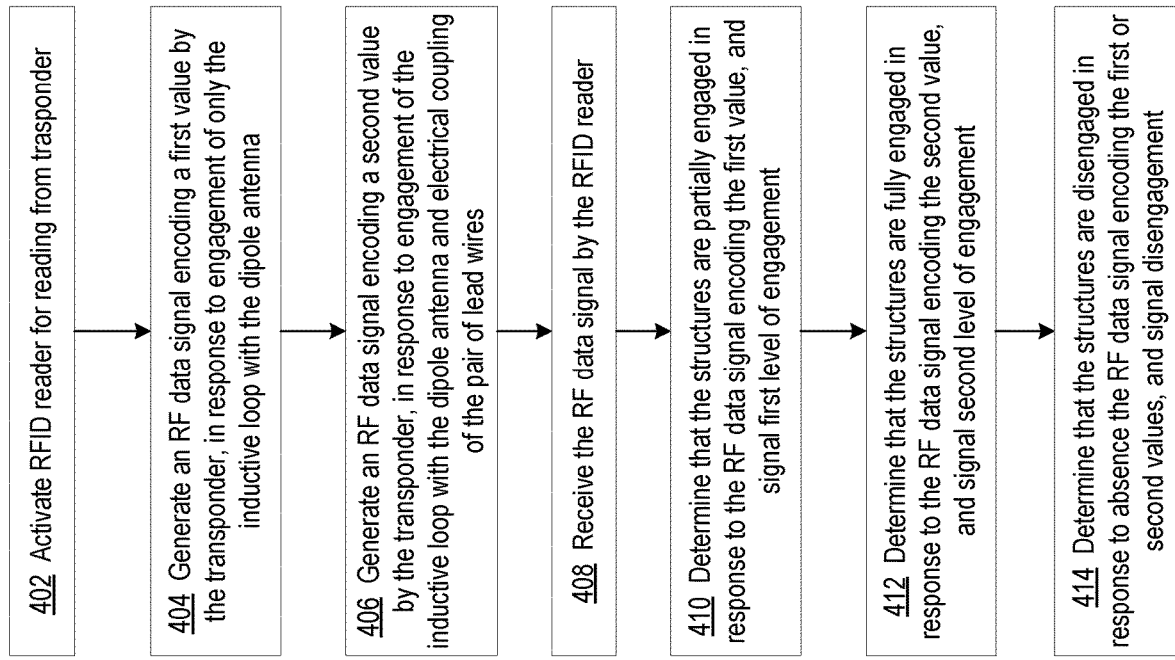
FIG. 4 shows a flowchart of an exemplary process of determining levels of engagement of multiple structures using a multi-part transponder arrangement.

FIG. 4 shows a flowchart of an exemplary process of determining levels of engagement of multiple structures using a multi-part transponder arrangement. At block 402, an RFID reader can be activated for reading from the transponder arrangement. In response to activation, the RFID reader generates an RF signal having sufficient energy to cause the dipole antenna in the transponder arrangement to resonate.

In response to the dipole antenna resonating and inducing a current in the inductive loop, and the wire leads of the transponder arrangement having an expected level of electrical coupling, at block 404 the transponder IC generates an RF data signal that encodes a first value. The first value can indicate a first level of engagement, for example, partial engagement, of the structures. In response to the dipole antenna resonating and inducing a current in the inductive loop, and the level of electrical coupling between the wire leads of the transponder arrangement being less than or greater than an expected level, at block 406 the transponder IC generates an RF data signal that encodes a second value. The second value can indicate a second level of engagement, for example, full engagement, of the structures.

At block 408, the RFID reader receives the RF data signal generated by the transponder arrangement. At block 410, the RFID reader can determine that the structures are partially engaged in response to the RF data signal encoding the first value. The RFID reader can also signal detection of the partial engagement by outputting audio, video, or other signals to a user or to other electronic equipment. At block 412, the RFID reader can determine that the structures are fully engaged in response to the RF data signal encoding the second value. The RFID reader can also signal detection of the full engagement by outputting audio, video, or other signals to a user or to other electronic equipment.

At block 414, the RFID reader detects that the transponder arrangement is non-responsive to the generated RF signal, and determines that the structures are disengaged based on the absence of an RF data signal from the transponder.

Though aspects and features may in some cases be described in individual figures, it will be appreciated that features from one figure can be combined with features of another figure even though the combination is not explicitly shown or explicitly described as a combination.

The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. A transponder arrangement, comprising:
   a transponder integrated circuit (IC);
   an inductive loop coupled to the transponder IC;
   a dipole antenna having an induction portion, the dipole antenna and inductive loop configured for engagement with one another;
   a first wire and a second wire having respective ends coupled to pins of the transponder IC and having portions configured for different levels of electrical coupling between the first wire and second wire;
   wherein:
      the dipole antenna resonates in response to a radio frequency (RF) signal;
      engagement of the inductive loop with the induction portion of the dipole antenna induces current flow in the inductive loop in response to the dipole antenna resonating;
      disengagement of the inductive loop from the induction portion of the dipole antenna makes the transponder IC non-responsive to the RF signal;
      the transponder IC is configured to generate an RF data signal that encodes a first data value indicating partial engagement in response to the current flow in the inductive loop and a first level of electrical coupling between the first wire and the second wire; and
      the transponder IC is configured to generate an RF data signal that encodes a second data value indicating full engagement in response to the current flow in the inductive loop and a second level of electrical coupling between the first wire and the second wire.

2. The transponder arrangement of claim 1, wherein the dipole antenna and inductive loop are configured for alternative positioning of engagement with and disengagement from one another.

3. The transponder arrangement of claim 1, further comprising a connector, wherein the portions of the first wire and second wire are configured for positioning of contact with the connector.

4. The transponder arrangement of claim 3, wherein the connector is electrically conductive.

5. The transponder arrangement of claim 3, wherein the connector is electrically non-conductive.

6. The transponder arrangement of claim 1, further comprising a connector, wherein the portions of the first wire and second wire are configured for alternative positioning of contact and non-contact with the connector.

7. The transponder arrangement of claim 6, wherein the connector is electrically conductive.

8. The transponder arrangement of claim 6, wherein the connector is electrically non-conductive.

9. The transponder arrangement of claim 1, wherein the dipole antenna is round wire.

10. The transponder arrangement of claim 9, wherein the dipole antenna is disposed on a flexible substrate.

11. The transponder arrangement of claim 1, wherein the transponder IC and inductive loop are disposed in a packaged device.

12. An apparatus, comprising:
a first support structure;
a transponder integrated circuit (IC) disposed on the first support structure;
an inductive loop coupled to the transponder IC and disposed on the first support structure;
a first wire and a second wire having respective ends coupled to pins of the transponder IC and having portions configured for different levels of electrical coupling between the first wire and the second wire;
a second support structure;
a dipole antenna disposed on the second support structure and having an induction portion, the first support structure and the second support structure configured for engagement between the dipole antenna and inductive loop;
wherein:
the dipole antenna resonates in response to a radio frequency (RF) signal from an RFID reader;
engagement of the inductive loop with the induction portion of the dipole antenna induces current flow in the inductive loop in response to the dipole antenna resonating;
disengagement of the inductive loop from the induction portion of the dipole antenna makes the transponder IC non-responsive to the RF signal;
the transponder IC is configured to generate an RF data signal that encodes a first data value indicating partial engagement in response to the current flow in the inductive loop and a first level of electrical coupling between the first wire and the second wire; and
the transponder IC is configured to generate an RF data signal that encodes a second data value indicating full engagement in response to the current flow in the inductive loop and a second level of electrical coupling between the first wire and the second wire.

13. The apparatus of claim 12, wherein the first support structure and the second support structure are configured for alternative positioning of engagement with and disengagement between the dipole antenna and the inductive loop.

14. The apparatus of claim 12, further comprising a third structure having a connector, wherein the portions of the first wire and second wire are configured for positioning of contact with the connector.

15. The apparatus of claim 14, wherein the connector is electrically conductive.

16. The apparatus of claim 14, wherein the connector is electrically non-conductive.

17. The apparatus of claim 12, further comprising a third structure having a connector, wherein the third structure and first structure are configured for alternative positioning of engagement and disengagement that dispose the portions of the first wire and second wire in positions of contact and non-contact with the connector, respectively.

18. The apparatus of claim 17, wherein the connector is electrically conductive.

19. The apparatus of claim 17, wherein the connector is electrically non-conductive.

20. The apparatus of claim 12, further comprising a switch coupled between the portions of the first wire and the second wire.

21. The apparatus of claim 12, wherein the dipole antenna is round wire.

22. The apparatus of claim 21, wherein the dipole antenna is disposed on a flexible substrate.

23. The apparatus of claim 12, wherein the transponder IC and inductive loop are disposed in a packaged device.

24. A method, comprising:
generating a radio frequency (RF) signal by an RF identification (RFID) reader for determining whether two or more structures are fully engaged, partially engaged, or disengaged, wherein the two or more structures have disposed thereon:
a transponder integrated circuit (IC),
an inductive loop coupled to the transponder IC,
a dipole antenna having an induction portion, the dipole antenna and inductive loop configured for alternative positioning of engagement with and disengagement from one another, and
a first wire and a second wire having respective ends coupled to pins of the transponder IC and having portions configured for different levels of electrical coupling between the first wire and the second wire;
generating by the transponder IC, an RF data signal that encodes a first data value indicating partial engagement in response to current flow in the inductive loop and a first level of electrical coupling between the first wire and the second wire;
generating by the transponder IC, an RF data signal that encodes a second data value indicating full engagement in response to the current flow in the inductive loop and a second level of electrical coupling between the first wire and the second wire;
determining by the RFID reader that the two or more structures are partially engaged in response to receiving the RF data signal encoding the first data value;
determining by the RFID reader that the two or more structures are fully engaged in response to receiving the RF data signal encoding the second data value; and
determining by the RFID reader that the two or more structures are disengaged in response to absence of an RF data signal form the transponder IC.

* * * * *